W. E. BABCOCK.
SIDING-GAGE.
No. 172,292. Patented Jan. 18, 1876.
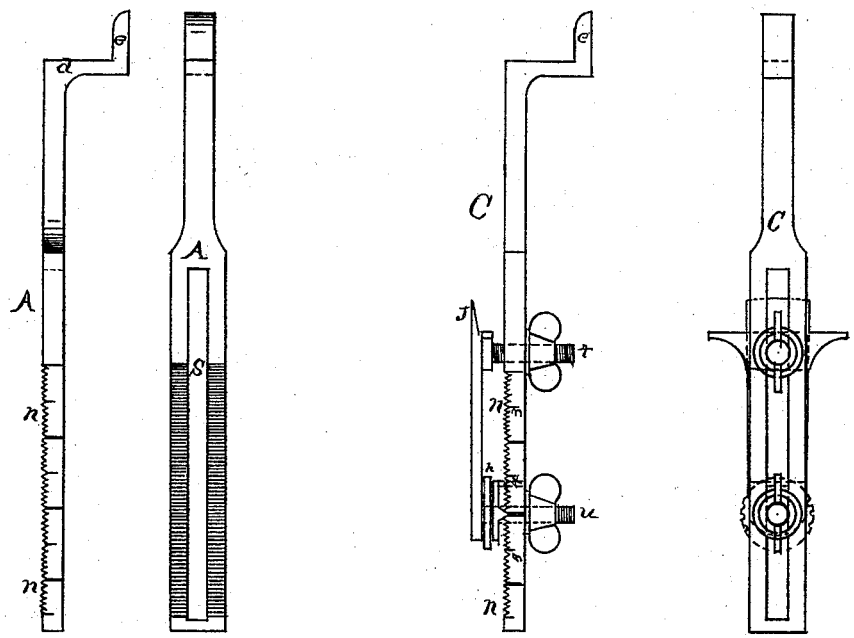
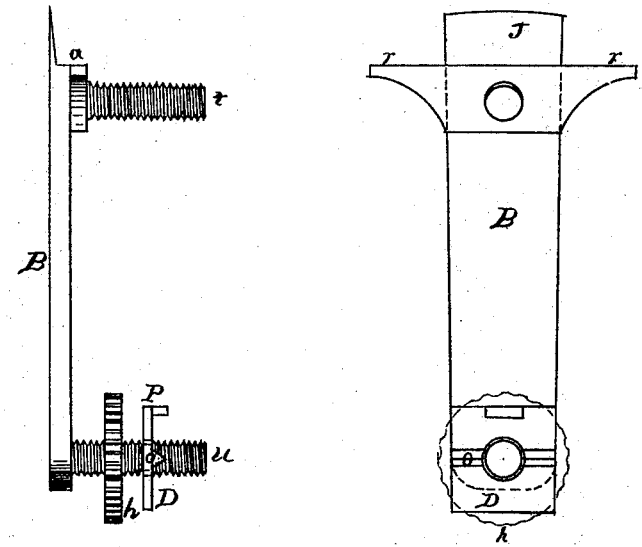
Witnesses,
Jacob T. Arnold
Lucius B. Parmele
Inventor
William E. Babcock.

UNITED STATES PATENT OFFICE.

WILLIAM E. BABCOCK, OF EAST PEMBROKE, NEW YORK.

IMPROVEMENT IN SIDING-GAGES.

Specification forming part of Letters Patent No. 172,292, dated January 18, 1876; application filed June 5, 1873.

*To all whom it may concern:*

Be it known that I, WILLIAM E. BABCOCK, of East Pembroke, county of Genesee and State of New York, have invented an Improvement in Siding-Gages, of which the following is a specification:

My invention relates to an implement to be used in adjusting, fitting, and putting on clapboards and other like purposes in building, and in place of what is commonly known as the gage-nail. It consists of three principal parts, and is constructed of iron, steel, or other metal, and of any desirable size. The longer part I term the bar; the next largest part I term the slide; the third and smallest part I term the adjustable pivot. The parts properly joined form the clapboard-gage, and is an improvement upon the patent granted to me June 27, 1871, No. 116,256.

A A is the bar. B B is the slide. D D is the adjustable pivot. C C are the parts joined, forming the gage.

The slide B has a shoulder, $a$, with projections $r\ r$ at each side, which serve to keep the tool in an upright position when in use. Near each end of the slide is a projection, $t\ u$, threaded and of sufficient length to pass through the slot in the bar to receive the thumb-nuts. Upon the projection $u$ is placed the nut $h$, and also the adjustable pivot hereinafter described, the nut $h$ having first been screwed down to the slide. The adjustable pivot D has a hole near the center of sufficient size to pass over the projection $u$. Upon each side, and in line with the center of the hole, is formed the pivot $o$, arranged to fit into the notches in the bar at right angle with the pivot, and near the edge of the piece is a projection, P, which extends into the slot in the bar, and serves to keep the pivot in proper position to engage with the notches in the bar. The slide being placed on the bar, the thumb-nuts, screwed down, hold them firmly together. To adjust the tool to thicker boards, turn back the thumb-nut at $u$, then turn back the nut $h$ until the bar and slide are far enough apart to correspond to the thickness of board being used, then fasten with the thumb-nut again.

I claim as my invention—

The combination of the nut $h$, the adjustable pivot D, provided with the projection P, and the shoulder $a$, having side projections $r\ r$, substantially as described, and for the purpose set forth.

WILLIAM E. BABCOCK.

Witnesses:
JACOB T. ARNOLD,
LUCIUS B. PARMELE.